US010885471B2

(12) United States Patent
Purvis et al.

(10) Patent No.: US 10,885,471 B2
(45) Date of Patent: Jan. 5, 2021

(54) SYSTEM AND METHOD FOR PROVIDING LOCATION-BASED DATA ON A WIRELESS PORTABLE DEVICE

(75) Inventors: Christopher Purvis, La Crescenta, CA (US); Laura Kampo, Sunland, CA (US); Kevin Rice, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 553 days.

(21) Appl. No.: 12/584,962

(22) Filed: Sep. 14, 2009

(65) Prior Publication Data
US 2010/0063854 A1 Mar. 11, 2010

Related U.S. Application Data

(63) Continuation-in-part of application No. 12/218,802, filed on Jul. 18, 2008, now Pat. No. 8,254,953.

(51) Int. Cl.
*G06Q 30/00* (2012.01)
*G06Q 10/02* (2012.01)
(Continued)

(52) U.S. Cl.
CPC ............ *G06Q 10/02* (2013.01); *H04L 67/04* (2013.01); *H04L 67/18* (2013.01); *H04W 4/021* (2013.01);
(Continued)

(58) Field of Classification Search
CPC .... G07C 11/00; G07C 2011/02; G06Q 30/02; G06Q 10/02; G06Q 30/0625; H04W 4/029; H04M 3/38
(Continued)

(56) References Cited

U.S. PATENT DOCUMENTS 5,978,770 A * 11/1999 Waytena et al. .................. 705/5
6,343,317 B1 * 1/2002 Glorikian ............ G06F 16/9537
709/218
(Continued)

FOREIGN PATENT DOCUMENTS

WO WO-2009079519 A3 * 9/2009 ......... G06Q 30/0267

OTHER PUBLICATIONS

Dae-Young Kim, Jungkun Park and Alastair M. Morrison, "A Model of Traveller Acceptance of Mobile Technology", 2008, Int. J. Tourism Res. 10, pp. 393-407. (Year: 2008).*
(Continued)

*Primary Examiner* — Shannon S Campbell
*Assistant Examiner* — Freda A Nelson
(74) *Attorney, Agent, or Firm* — Farjami & Farjami LLP

(57) ABSTRACT

There is provided a wireless portable device for providing location-based data to a user in a defined geographical area including a plurality of points of interest, the wireless portable device comprising a wireless transmitter, a wireless receiver, and a display. The wireless transmitter can transmit location information to a wireless server over a wireless network. The wireless receiver can receive location-based data relating to a point of interest from the wireless server periodically and automatically, based on the location of the wireless portable device. By optimizing map routes and schedules using the location-based data and user preferences including wish lists, the wireless portable device can provide helpful recommendations via the display, enabling the user to plan an efficient schedule of activities in the defined geographical area optimized by walking distance, queue wait times, booking and arriving at reserved events, and/or by other user preferences.

26 Claims, 5 Drawing Sheets

(51) Int. Cl.
*G07C 11/00* (2006.01)
*H04W 4/024* (2018.01)
*H04W 4/021* (2018.01)
*H04L 29/08* (2006.01)

(52) U.S. Cl.
CPC ............ *H04W 4/024* (2018.02); *G07C 11/00* (2013.01); *G07C 2011/02* (2013.01)

(58) Field of Classification Search
USPC ............ 705/14, 5, 14.55; 701/408; 235/385; 455/456.3
See application file for complete search history.

(56) References Cited

U.S. PATENT DOCUMENTS

| | | | | |
|---|---|---|---|---|
| 6,889,900 | B2* | 5/2005 | Davies | G06Q 10/047 235/385 |
| 6,996,413 | B2* | 2/2006 | Inselberg | H04H 20/38 455/517 |
| 7,603,139 | B1* | 10/2009 | Tom | 455/557 |
| 7,778,873 | B2* | 8/2010 | Crolley | G06Q 30/02 705/14.64 |
| 2002/0087401 | A1* | 7/2002 | Leapman | G06Q 30/0257 705/14.55 |
| 2004/0224703 | A1* | 11/2004 | Takaki et al. | 455/457 |
| 2006/0105783 | A1* | 5/2006 | Giraldin et al. | 455/456.3 |
| 2007/0026855 | A1* | 2/2007 | Enenkiel | 455/425 |
| 2007/0109134 | A1* | 5/2007 | Dugan et al. | 340/573.1 |
| 2007/0178912 | A1* | 8/2007 | Baranowski | 455/456.2 |
| 2007/0281692 | A1* | 12/2007 | Bucher | G06Q 30/02 455/435.1 |
| 2008/0059060 | A1* | 3/2008 | Irish | H04L 67/38 701/408 |
| 2008/0150921 | A1* | 6/2008 | Robertson | G06F 3/0346 345/204 |
| 2009/0177603 | A1* | 7/2009 | Honisch | G01S 19/48 706/45 |
| 2010/0030578 | A1* | 2/2010 | Siddique | G06Q 40/12 705/3 |
| 2012/0078702 | A1* | 3/2012 | Rissanen | G06Q 30/0222 705/14.26 |

OTHER PUBLICATIONS

"Disney Parks Mobile Magic." verizonwireless.com. 2009. Verizon Wireless. Nov. 25, 2009 <http://mediastore.verizonwireless.com/onlineContentStore/index.html?lid=//global//entertainment=and=apps//apps#displayName=Disney%20Parks%20Mobile%20Magic&contentType=APPLICATN&selectedItemID=35607857>.

"Disney World Wait Times." versaedge.com. 2001-2009. VersaEdge Software, LLC. Nov. 25, 2009 <http://www.versaedge.com/iphone/disneyworldwaittimes/>.

"Hongkong Disneyland Ride Wait Times" www.apple.com. Nov. 25, 2009 <http://www.apple.com/webapps/entertainment/hongkongdisneylandridewaittimes.html>.

"MouseWait" www.mousewait.com. 2009. MouseWait. Nov. 25, 2009 <http://www.mousewait.com/>.

\* cited by examiner

SYSTEM AND METHOD FOR PROVIDING LOCATION-BASED DATA ON A WIRELESS PORTABLE DEVICE

RELATED APPLICATIONS

This application is a continuation-in-part of U.S. patent application Ser. No. 12/218,802, filed Jul. 18, 2008, which is hereby incorporated by reference.

BACKGROUND OF THE INVENTION

1. Field of the Invention

The present invention relates generally to electronic circuits and systems. More particularly, the present invention relates to communications systems for transmission of digital data.

2. Background Art

Events held at locales such as convention halls, trade shows, exhibits, fairgrounds, theme parks, and other large event spaces can provide an invaluable centralized forum for professional, intellectual, and social development. Whether keeping updated with trends in the industry, networking with peers sharing common interests, or simply having fun with friends and family, these event gatherings can provide exciting, memorable, and rewarding experiences when properly coordinated and well organized. Such events might be wholly contained in one large facility, spread out through multiple buildings such as adjacent hotels, or even encompass hundreds of acres for a large theme park. When an event reaches sizes of these proportions, it may be impossible for guests to experience all the things happening in disparate locations at the same time. Thus, guests will need to make some sacrifices and selectively plan where to go and which events to prioritize.

One common event-planning tool is a preprinted schedule. However, as event planners and guests alike will undoubtedly attest, events do not always proceed according to plan, and last minute changes are almost inevitable. As a result, the perfectly coordinated paper schedule only remains perfect at the time of printing; unforeseen circumstances may result in significant deviations, resulting in dissatisfaction among guests, who feel helpless and without control. The lack of current, updated information to make informed decisions often leads to suboptimal choices using imperfect data, wasting time and trying the patience of the beleaguered guest.

Another event-planning tool is a preprinted map, showing points of interest and perhaps referencing the schedule as well. However, as the area of the event increases, an ever increasingly large and complex map may become more unwieldy and unhelpful to use than nothing at all. The logistical question of reaching a desired destination becomes a larger and larger headache for the guest. Without any knowledge of crowd and traffic conditions, wait times, alternative paths, and other valuable navigational information, a guest is left to haphazardly pick a random path or ask directions from a bystander who may be just as uninformed as the guest.

Additionally, there is the issue of tedium, boredom, and irritation during waiting and long queue lines that are inevitable in any large event gathering. Although some guests may come prepared with material to keep themselves busy during these involuntary idle times, many others may not bring such materials for various reasons. Such reasons might include concerns of loss or theft, desire to reduce extra baggage, expectations of event planning efficiency, or simply forgetting to pack such materials. Unfortunately, even the most thoughtfully planned events might have unexpectedly long waits, and average or poorly organized events will obviously suffer even more in this regard.

Even if event organizers strive to improve service and satisfaction among guests, it is often difficult to obtain solid data on how to most effectively improve. Survey forms are often used to solicit subjective guest feedback, but such surveys may be of limited usefulness due to guest apathy, polarized opinions, and inaccurate reporting. Other methods of soliciting guest feedback might be too invasive or troublesome to implement in a cost effective and sensitive manner. Discreetly obtaining measurable, objective criteria illustrating areas in need of improvement may allow event planners to address guest concerns more effectively in future events, resulting in increased guest satisfaction without a large cognitive burden on the part of the guest.

Accordingly, there is a need to overcome the drawbacks and deficiencies in the art by providing a way for guests attending an event to conveniently access relevant and up to date scheduling, navigational and entertainment resources to plan available time more effectively, thus promoting guest satisfaction and providing event planners with valuable feedback to improve service.

SUMMARY OF THE INVENTION

A system and method for providing location-based data on a wireless portable device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing location-based data on a wireless portable device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
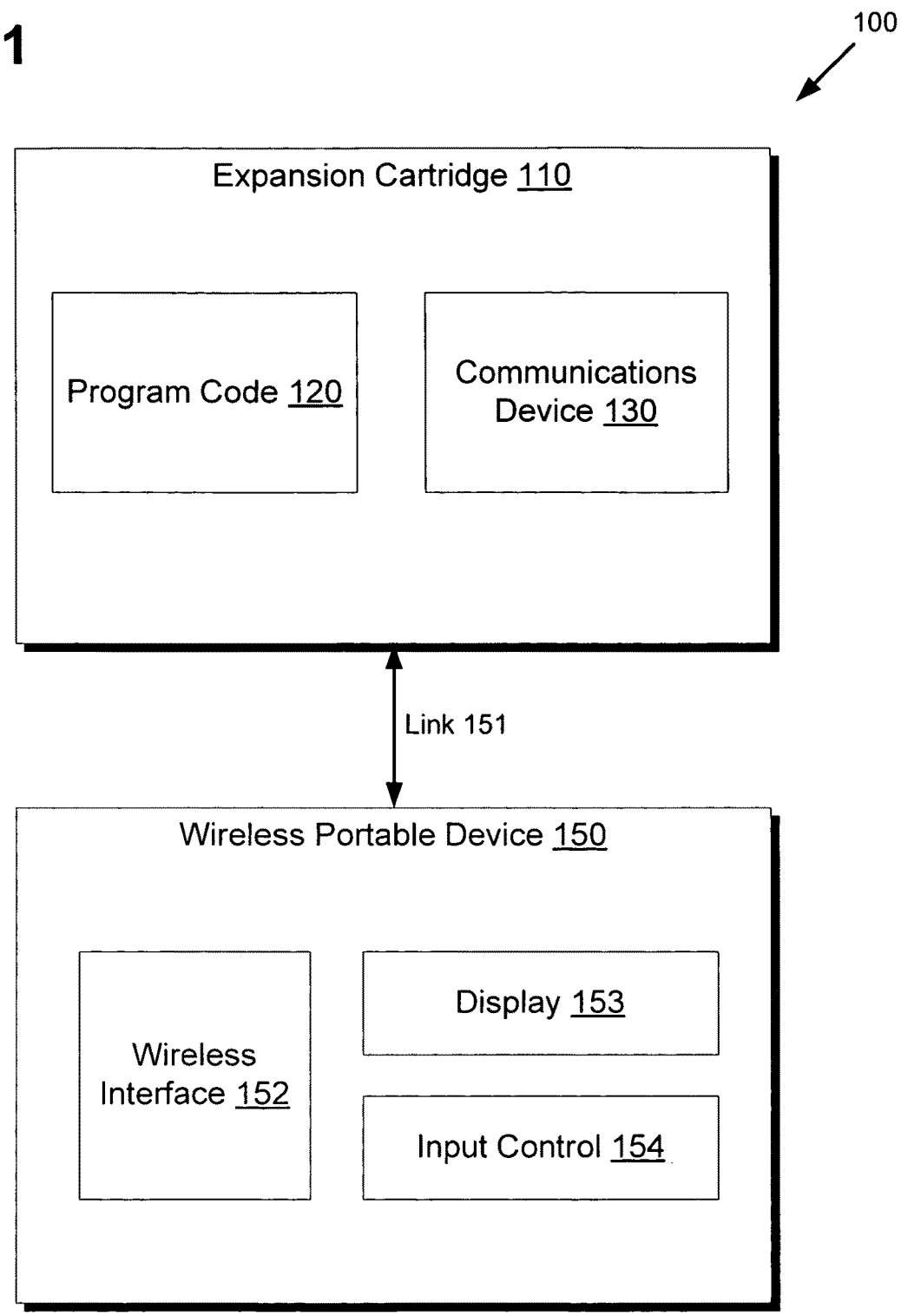
FIG. 1 presents a block diagram of an expansion cartridge for a wireless portable device, in accordance with one embodiment of the present invention.

FIG. 1 presents a block diagram of an expansion cartridge for a wireless portable device, in accordance with one embodiment of the present invention. Expansion cartridge environment 100 includes expansion cartridge 110 and wireless portable device 150. Expansion cartridge 110 includes program code 120 and communications device 130. Wireless portable device 150 includes wireless interface 152, display 153, and input control 154. Link 151 provides bidirectional communication between expansion cartridge 110 and wireless portable device 150.

Wireless portable device 150 could be a number of different embodiments such as a mobile phone or a handheld videogame providing a display and an input control. For the present embodiment, consider that wireless portable device 150 might be a portable handheld videogame console. Wireless interface 152 might comprise a Wi-Fi network card capable of both transmitting and receiving data through Wi-Fi, providing online gaming, browsing, and other capabilities to the portable handheld videogame console. An alternative embodiment might instead use a card supporting Worldwide Interoperability for Microwave Access (WiMAX). Display 153 might be a liquid crystal display (LCD) screen, and input control 154 might be a touch sensitive element coupled with the LCD screen. Another embodiment might use an alternative display method, such as an organic light-emitting diode (OLED) screen. Yet another embodiment might use a different input control method, such as a traditional button and joystick setup. Regardless of the specific method being used, a user is enabled to receive some kind of visual feedback from display 153 and correspondingly respond or influence the behavior of wireless portable device 150 by using input control 154, which may result in data communications with a wireless network through wireless interface 152.

In the present embodiment, consider that expansion cartridge 110 might represent a matching videogame cartridge compatible with the portable handheld videogame console represented by wireless portable device 150. Expansion cartridge 110 might be connectable via a primary or secondary expansion bay on wireless portable device 150 via link 151, which might comprise an exposed row of electrical contacts held in place by friction, for example. In that embodiment program code 120 might comprise, for instance, a read only memory (ROM) chip containing software code that enables wireless portable device 150 to provide location-based data, further explained in conjunction with FIG. 4 below. Moreover, communications device 130 might represent an infrared receiver, providing a secondary communications channel to supplement wireless interface 152.

Expansion cartridge 110 may be configured into a number of other embodiments as well, however. For example, communications device 130 might be removed from the cartridge, sacrificing the secondary communications channel and leaving program code 120 to rely wholly on wireless interface 152 for network communications. In another embodiment, only communications device 130 might be preserved in the cartridge, forcing wireless portable device 150 to receive program code 120 from some other location. This alternative location might be a preloaded storage device on wireless portable device 150, or it might be remotely retrieved from a network server using wireless interface 152. In yet another embodiment, the cartridge might not exist at all. For an embodiment lacking a physical cartridge, program code 120 might be stored on a network server to be downloaded on demand to wireless portable device 150 via wireless interface 152. Link 151 might therefore represent a wireless network link rather than a physical connector of electrical contacts. Because such an embodiment lacks an expansion cartridge, it allows a user to participate in location-based data without purchasing or renting the expansion cartridge. However, for illustrative purposes, the present embodiment will use an expansion cartridge including both program code 120 and communications device 130 as shown in FIG. 1.

Figure 2:
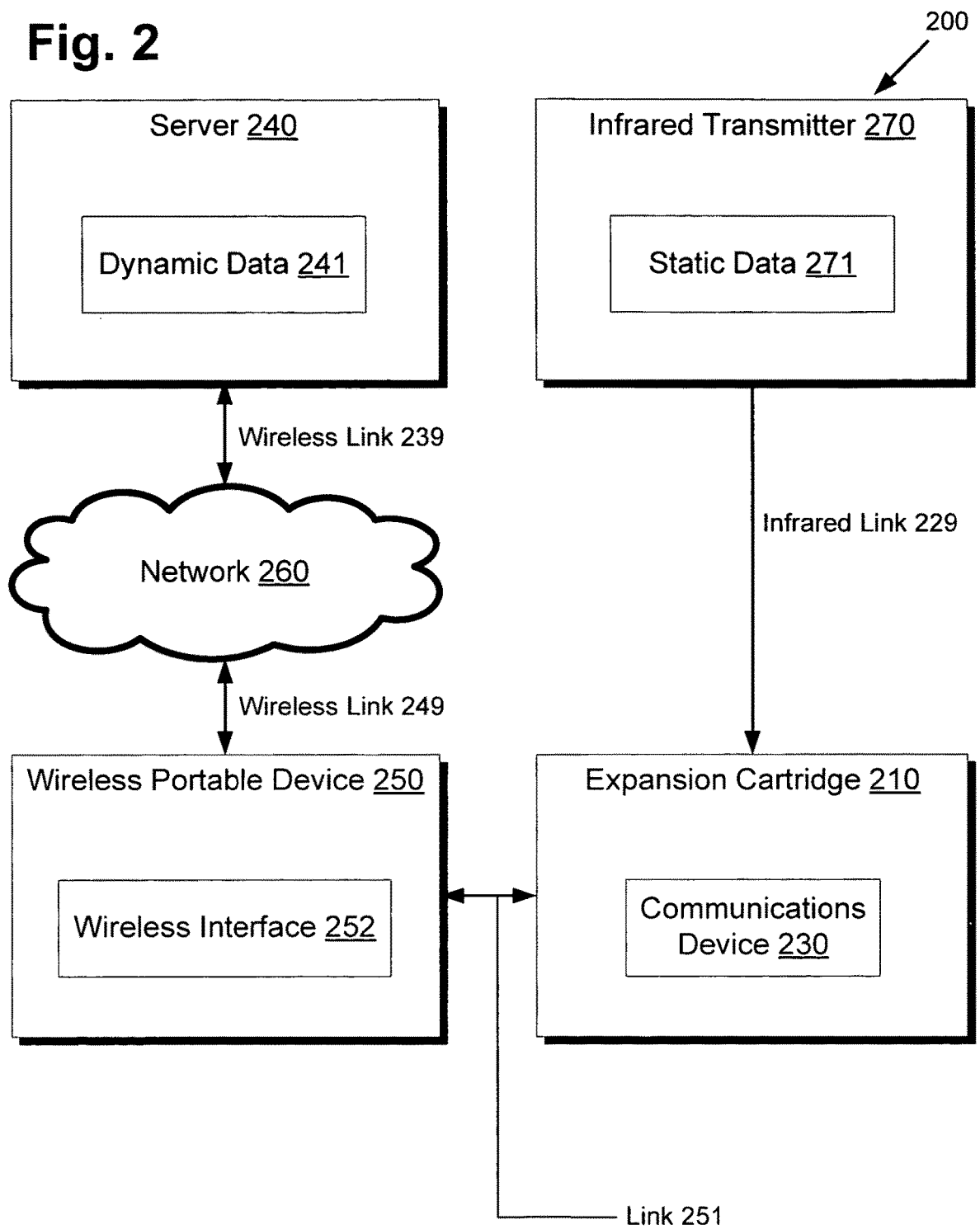
FIG. 2 presents a system for providing location-based data to a wireless portable device, in accordance with one embodiment of the present invention.

With the expansion cartridge now introduced, FIG. 2 presents a location-based data system for use with a wireless portable device, in accordance with one embodiment of the present invention. Location-based data system 200 includes expansion cartridge 210, wireless portable device 250, server 240, network 260, and infrared transmitter 270. Expansion cartridge 210 corresponds to expansion cartridge 110 from FIG. 1, and also includes communications device 230, which corresponds to communications device 130 from FIG. 1. Wireless portable device 250 corresponds to wireless portable device 150 from FIG. 1, and also includes wireless interface 252, corresponding to wireless interface 152 from FIG. 1. Link 251 corresponds to link 151 from FIG. 1, providing bidirectional communication between expansion cartridge 210 and wireless portable device 250. Server 240 includes dynamic data 241. Infrared transmitter 270 includes static data 271. Wireless links 239 and 249 allow server 240 and wireless portable device 250, respectively, to communicate across network 260. Infrared link 229 allows communications device 230 to receive from infrared transmitter 270.

For the purposes of introducing location-based data system 200, only one wireless portable device is presented, communicating across a single network directly servicing all wireless portable devices. Other components are also presented in single quantities, such as server 240 and infrared transmitter 270. Alternate embodiments may use multiple servers to distribute the dynamic data processing workload and multiple infrared transmitters to expand the coverage of a secondary communications channel. Additionally, for the sake of simplicity, wireless portable device 250 and expansion cartridge 210 have been simplified to emphasize communication functions in location-based data system 200. More specifically, components corresponding to display 153, input control 154, and program code 120 from FIG. 1 have been omitted.

Continuing with the videogame cartridge example used in conjunction with FIG. 1, link 251 might represent a physical electrical connection between wireless portable device 250 and expansion cartridge 210. Thus, according to the embodiment shown in FIG. 2, wireless portable device 250 has two channels of communications available: wireless link 249 and infrared link 229. Tracing infrared link 229 back to the source, infrared transmitter 270 can transmit static data 271 to expansion cartridge 210 via infrared link 229, where static data 271 can be further transferred to wireless portable device 250 via link 251. Static data 271 might hold a number of preloaded items such as a unique identifier, location coordinates, local map data, and other items relevant to the immediate vicinity. Tracing wireless link 249 back to the source, server 240 can transmit dynamic data 241 to wireless portable device 250 over network 260 using wireless links 239 and 249. Data can also flow in the reverse direction over wireless links 239 and 249, as indicated by the double arrows. Dynamic data 241 might hold a large database of updatable content, further detailed in the discussion of FIG. 4 below.

Static data 271 is labeled "static" to differentiate itself from dynamic data 241 in the sense that static data 271 might rarely or never be updated, whereas dynamic data 241 might be quite frequently updated. Dynamic data 241 can leverage server 240 for computationally intensive data transformations and network 260 for receiving updates from many other data sources. By contrast, static data 271 may receive little or no computational assistance from infrared transmitter 270 and may only be able to communicate with expansion cartridges having matching communication devices. Even this communications channel might be limited to transmission only, as indicated by the unidirectional arrow of infrared link 229 in FIG. 2. Although the limitations of this configuration necessitate cumbersome physical on-site replacement or reprogramming to update static data 271, the very same limitations allow the implementation of the secondary communications channel to remain simple.

For example, infrared transmitter 270 might simply transmit a short message signal of static data on repeated intervals, without regard to the inner workings of location-based data system 200. Resulting savings on development costs and effort might then be more effectively redirected to improving network 260, the primary communications channel. Alternative embodiments might specify a more fully featured secondary communications channel using bidirectional communication. The robustness of network 260, the desirability of a redundant communications link, and budget constraints might dictate the particular implementation of a secondary communications channel, if it is implemented at all.

For the present example, static data 271 might contain only a unique identifier associated with infrared transmitter 270. Infrared transmitter 270 thus transmits this unique identifier periodically, perhaps once every minute, to any expansion cartridge listening with a communications device. In this case, expansion cartridge 210 does have the necessary communications device 230 to listen. Using infrared link 229 and link 251, communications device 230 can relay the unique identifier to wireless portable device 250. In conjunction with data loaded on wireless portable device 250 or previously retrieved from dynamic data 241, wireless portable device 250 can associate the unique identifier with a specific defined area such as the range defined by the reach of infrared link 229, thus establishing the current location of wireless portable device 250 irrespective of the availability of wireless link 249. In this manner, the determined location of wireless portable device 250 may be updated more accurately than using network 260 alone.

In some embodiments, this particular relay of updated data might also be accomplished even when wireless portable device 250 is in a low power sleep state. One method this might be accomplished is to simply temporarily wake up wireless portable device 250 as needed, leaving it in the low power sleep state otherwise. For example, expansion cartridge 210 might send a signal through link 251 to wake up portable device 250 to full power, transfer the update data, and signal wireless portable device 250 to reenter the sleep mode after processing of the update data is complete. If wireless portable device 250 only receives the update data instead, it might process the data after it is explicitly woken up from the sleep state.

Shifting focus to the wireless data path, server 240 might represent a computer owned by the event organizers, located in a data center accessible to event organizers but isolated from ordinary guests. Dynamic data 241 might be changed and updated often as the "dynamic" name suggests. For example, intervention of the event organizers, data responses received over network 260, and logic contained in server 240 might modify the data contained in dynamic data 241. Network 260 enables such data to travel to and from server 240, wireless portable device 250, and any other wireless enabled device. This wireless interaction and dynamic data generation will be explained in more detail with the description of FIG. 4 below.

Figure 3:
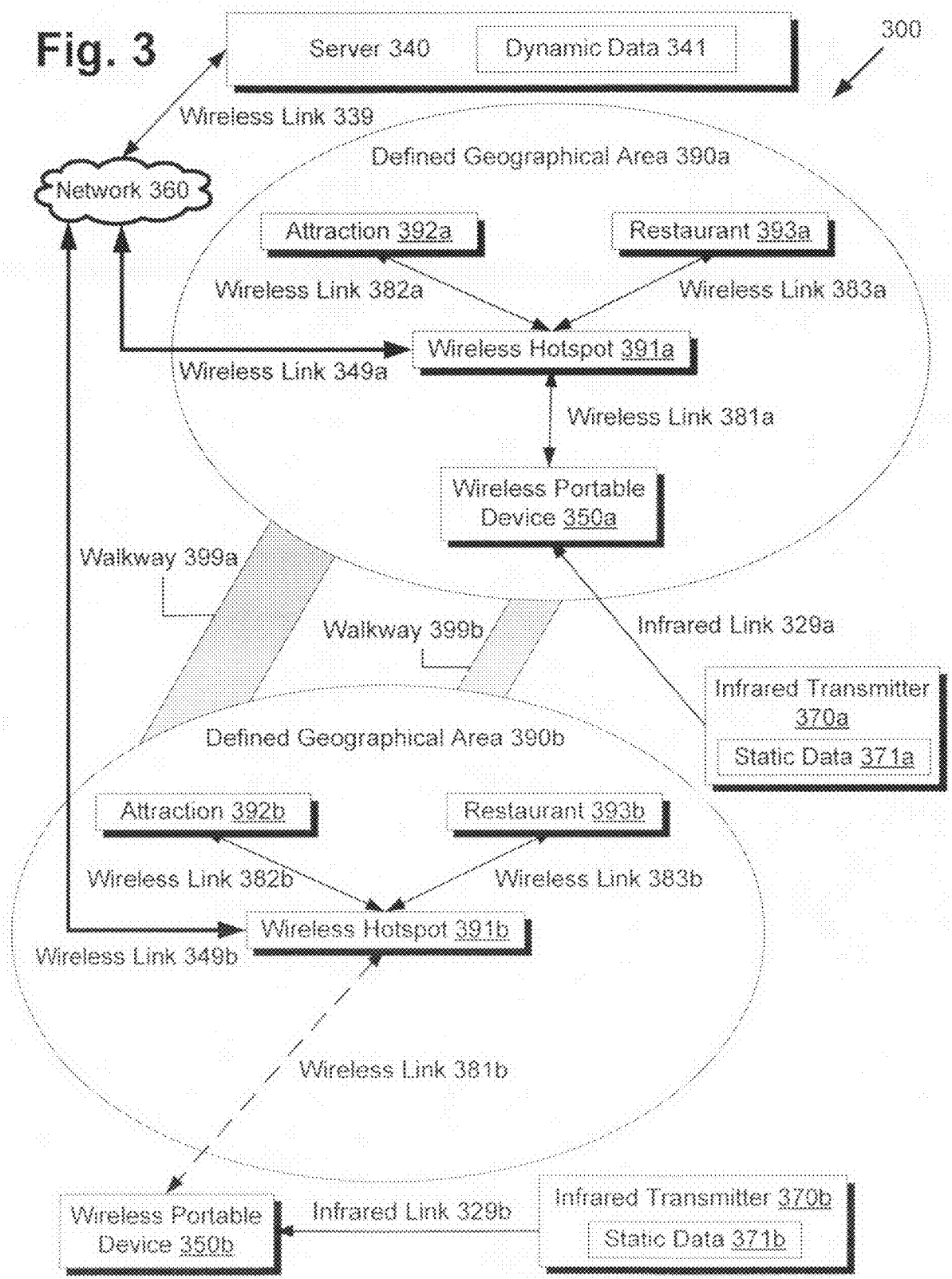
FIG. 3 presents a system for providing location-based data to a wireless portable device, in accordance with another embodiment of the present invention.

Moving to FIG. 3, FIG. 3 presents a location-based data system for use with a wireless portable device, in accordance with another embodiment of the present invention. Although FIG. 3 depicts areas and distances, FIG. 3 is not drawn to scale and is spatially organized to facilitate discussion of the location-based data system. Location-based data system 300 includes server 340, wireless portable device 350b, network 360, infrared transmitters 370a and 370b, defined geographical areas 390a and 390b, and walkways 399a and 399b. Defined geographical area 390a includes wireless hotspot 391a, attraction 392a, restaurant 393a, and wireless portable device 350a. Defined geographical area 390b includes wireless hotspot 391b, attraction 392b and restaurant 393b. Although the sensitivity of receiving wireless antennae may change the effective range of the wireless hotspots and thus the size of the defined geographical areas, these effects shall be ignored to simplify the discussion of FIG. 3.

Many components in FIG. 3 correspond to components in FIG. 2. For example, server 340 including dynamic data 341 corresponds to server 240 including dynamic data 241 in FIG. 2. Network 360 corresponds to network 260 in FIG. 2. Infrared transmitter 370a including static data 371a corresponds to infrared transmitter 270 including static data 271 in FIG. 2. Similarly, infrared transmitter 370b including static data 371b also corresponds to infrared transmitter 270 including static data 271 in FIG. 2. Infrared link 329a and infrared link 329b correspond to infrared link 229 in FIG. 2. Wireless link 349a and 349b corresponds to wireless link 249 in FIG. 2. Wireless link 339 corresponds to wireless link 239 in FIG. 2.

Wireless hotspot 391a communicates with a receiver of portable device 350a, attraction 392a, and restaurant 393a using wireless links 381a, 382a, and 383a, respectively. Wireless link 349a enables a backhaul connection to the broader network, network 360. Similarly, wireless hotspot 391b communicates with attraction 392b and restaurant 393b using wireless links 382b and 383b, respectively. However, since portable device 350b is outside defined geographical area 390b, it cannot communicate with wireless hotspot 391b. Wireless link 349b enables a backhaul connection to network 360. From network 360, data can travel through wireless link 339 to be exchanged with server 340. Walkways 399a and 399b provide physical rather than data pathways between defined geographical areas 390a and 390b.

Now, in the specific embodiment of FIG. 3, the setting for the event is narrowed down to represent a theme park scenario, with two distinct locations being represented by defined geographical areas 390a and 390b. Alternative embodiments might include many more defined geographical areas, but FIG. 3 is restricted to two areas to keep the discussion manageable.

Defined geographical area 390a might represent, for example, a pirate themed section of the theme park. Thus, attraction 392a might be a staged pirate ship show, and restaurant 393a might be a pirate themed seafood restaurant. Defined geographical area 390b might represent an outer space themed section of the theme park. Thus, attraction 392b might be a space themed rollercoaster, and restaurant 393b might be styled as a futuristic diner. Walkways 399a and 399b might represent walking paths between the two areas.

Alternative embodiments might use a similar arrangement to FIG. 3, substituting different points of interest for attractions 392a and 392b and restaurants 393a and 393b. For example, an industry trade exhibition might feature exhibitor booths instead of attractions, and guest speaker lectures instead of restaurants. Defined geographical area 390a and 390b might represent two separate hotels, and walkways 399a and 399b might be replaced with a shuttle service between the two hotels. Infrared transmitters 370a and 370b might be removed, since location tracking outside the hotels may be unnecessary. Alternatively, the infrared transmitters might be relocated within the defined geographical areas, providing more accurate indoor location detection than using wireless hotspots alone.

Figure 4:
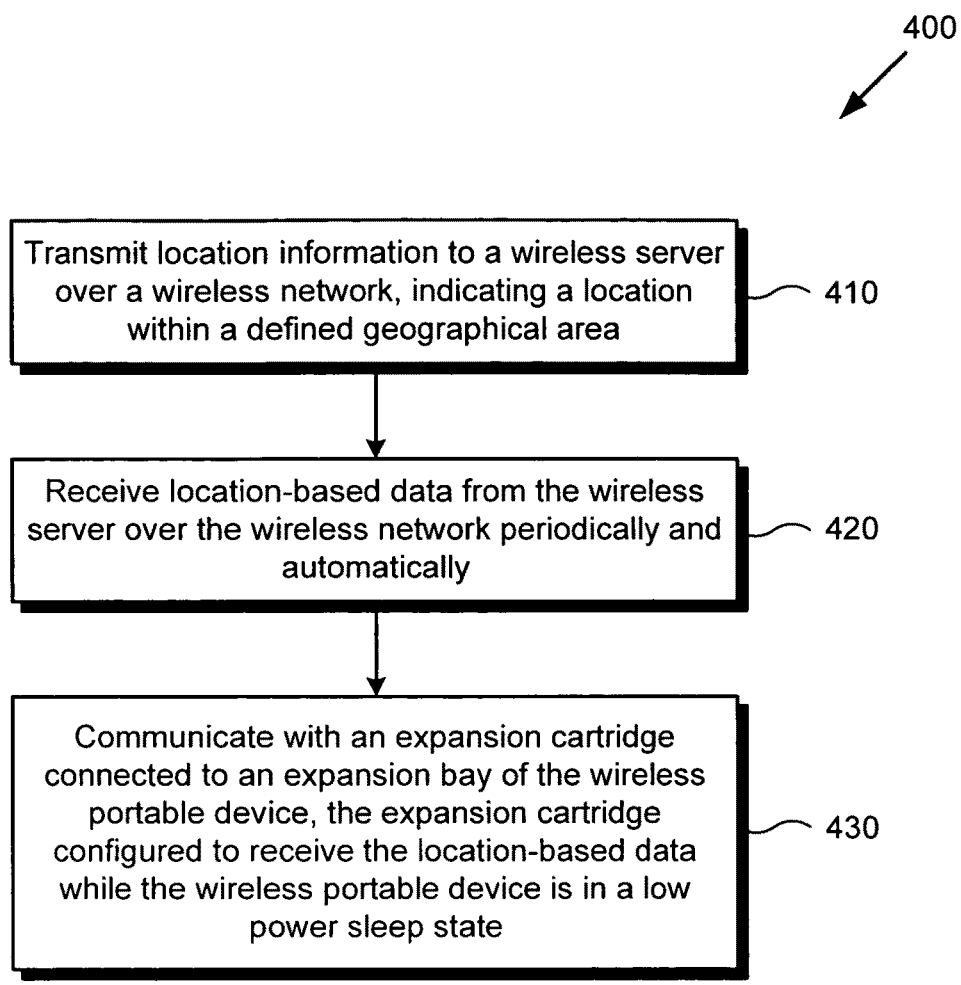
FIG. 4 shows a flowchart describing the steps, according to one embodiment of the present invention, by which a wireless portable device can provide location-based data to a user in a defined geographical area including a plurality of points of interest.

Now that some example configurations of location-based data systems have been presented, FIG. 4 shows a flowchart describing the steps, according to one embodiment of the present invention, by which a wireless portable device can provide location-based data to a user in a defined geographical area including a plurality of points of interest. Certain details and features have been left out of flowchart 400 that are apparent to a person of ordinary skill in the art. For example, a step may comprise one or more substeps or may involve specialized equipment or materials, as known in the art. While steps 410 through 430 indicated in flowchart 400 are sufficient to describe one embodiment of the present invention, other embodiments of the invention may utilize steps different from those shown in flowchart 400.

Referring to step 410 of flowchart 400 in FIG. 4 and location-based data system 300 of FIG. 3, step 410 of flowchart 400 comprises wireless portable device 350a transmitting location information over wireless network 360 to server 340, the location information indicative of a location within defined geographical area 390a. In one embodiment, the location information is determined by the wireless portable device. Since FIG. 3 depicts multiple wireless portable devices, both wireless portable device 350a and wireless portable device 350b will attempt to carry out step 410, although only wireless portable device 350a will be successful due to wireless link 381b being out of range for wireless portable device 350b. Executing program code accessible from the wireless portable devices might initiate this step. To simplify the representation of FIG. 3, expansion cartridge 110 shown in FIG. 1 is integrated into wireless portable devices 350a and 350b, including the program code and the communications device, which is an infrared receiver in this example. Thus, referring to the embodiment of FIG. 3, the program is already resident on the wireless portable device and readily executable. Alternative embodiments might separate the location of the program code, rendering step 410 more involved. For instance, the program code might be resident on server 340, downloadable to the wireless portable devices over network 360. Once the program code is executed, the wireless portable device identifies its location and sends the location data to server 340. In the present embodiment, this identification is made possible by the unique identifier associated with connected wireless hotspot 391a.

At step 420 of flowchart 400, wireless portable device 350a periodically and automatically receives location-based data from server 340 over wireless network 360. The location-based data is based on the location of wireless portable device 350a as well as the plurality of points of interest within defined geographic area 390a, including attraction 392a and restaurant 393a. Of course, the wireless portable devices can send and receive on demand as well, but the automatic streaming of location-based data without user intervention is one of the steps that merit further discussion. Continuing with the theme park example, consider that a guest named Amy is holding wireless portable device 350a while exploring the park. While Amy is within range of wireless hotspot 391a, the program code executing on wireless portable device 350a might periodically request an update from server 340 once every minute. Alternatively, server 340 might send periodic notifications to all listening wireless portable devices, or a combination of both requests and notifications might be used. Regardless of the particular implementation, each wireless portable device will be able to receive automatic updates on some periodic, regular basis while wireless connectivity is present.

Many different types of location-based data might be provided to Amy. "Location-based" is used here in the sense that the data could depend on the location of the associated wireless portable device. However, the data could also be time sensitive, or it could depend on some other variable, external to the wireless portable device and retrieved from the wireless network. Location specific data such as positioning and maps will be discussed in greater detail in conjunction with FIG. 4. Time sensitive data could include schedules or time limited promotions. External variables could cover details relating to points of interest within a defined geographic area such as wait and queue times, map traffic, restaurant reservation status, or any other item that might be accessible from network 360. For example, attraction 392a, the pirate ship stage show, might automatically calculate the estimated queue wait time based on sensors placed along the queue and transmit that wait time over wireless link 382a to be stored in dynamic data 341 on server 340. When an automatic update occurs, Amy will be able to check how long the estimated wait time at attraction 392a will be, and she can decide whether it is worth spending 30 minutes in line to see the pirate ship attraction. Similarly, restaurant 393a, the pirate themed seafood restaurant, might send an estimated wait time to server 340 based on guest seating turnover times and customer queue length. Using this dynamically updated data, Amy can make informed decisions on how to spend her time, helping her feel in control and making the most of her limited available time.

Theme park operations staff might also decide to broadcast promotional materials relevant to the time and location of the wireless portable device. For example, if restaurant 393a is not operating at optimum capacity, park operations staff might instruct server 340 to send a promotional message or coupon to selected guests within defined geographical area 390a, offering them a free shrimp cocktail with their dinner, valid from 6:00 to 8:00 pm. By simply carrying a compatible wireless portable device, guests can easily receive offers relevant to the present time and location while park operations can conduct promotional campaigns more effectively to targeted audiences.

Although the previous examples have limited the coverage of the location-based data received on wireless portable device 350a to items within defined geographical area 390a, coverage could potentially extend beyond this area. Depending on the available wireless bandwidth, the size of the event, and the comprehensiveness of coverage desired, automatic updates might only concern immediate surroundings, the entire theme park, or something in between. However, to avoid overwhelming the user with information overload, automatic updates might only cover a reasonable surrounding area, leaving detailed long distance queries for requests on demand. For example, if the theme park of the present example spread out to numerous other defined geographical areas not depicted in FIG. 3, it might be reasonable to also include information about adjacent areas in automatic updates. In that particular embodiment, the automatic updates might also include items from defined geographical area 390b, such as wait times for attraction 392b, the space themed rollercoaster, and wait times for restaurant 393b, the futuristic diner. Traffic conditions provided by sensors on walkway 399a and 399b might also help plan any routes to and from defined geographical areas 390a and 390b.

Shifting to wireless portable device 350b, this particular unit might be carried by Ben, a friend of Amy. However, unlike Amy, Ben does not have an available wireless link to receive dynamic data. This does not mean that Ben is completely out of options, depending on how much time has passed since Ben last received an automatic update. Although Ben will neither be able to request demands from server 340 nor receive current automatic updates, the last received automatic update can provide at least a somewhat current representation of the state of the theme park. Infrared transmitter 370b might also provide a more accurate position estimate, the process of which shall be discussed in greater detail with FIG. 4. Wireless portable device 350b can still therefore provide functional but somewhat degraded interactivity for Ben using the outdated data. Thus, Ben can still interact with wireless portable device 350b in an offline state, but some features requiring access to network 360 may be unavailable or less accurate.

Once Ben reenters an area with wireless reception such as defined geographical areas 390b and 390a, wireless portable device 350b might request an update from server 340, filling in the data gaps due to being disconnected from network 360. Thus, wait times for attraction 392b and restaurant 393b might be updated to reflect current conditions, and location-based data associated with defined geographical area 390b might be downloaded. For example, an outer space shooting game or an informational astronomy video might be downloaded to wireless portable device 350b. If the shooting game or astronomy video already exists on the device, the download step might be skipped to save network bandwidth.

By leveraging these automatic updates, the wireless portable device might provide an interactive map with routing, scheduling, and event reservation capabilities. For example, a map showing the surrounding area might be displayed on the wireless portable device. If the user desires to zoom out or view a different area of the park, such a request could be sent to server 340, which would respond with the requested data pulled from dynamic data 341. Portions of the map might also be preloaded onto the wireless portable device to reduce the amount of data to transfer. The map might be configurable to filter certain information and focus only on things the user is interested in. For example, a point of interest dialog might be selectable on the side, allowing a user to display only restroom facilities, restaurants, automatic teller machines, attractions by category, or other points of interest.

Additionally, configurable routing capabilities might be built into the map, allowing a user to plan the most optimal route based on some desired characteristics. For example, a user might be interested in the fastest way of traveling from defined geographical area 390a to defined geographical area 390b. Server 340 could query the traffic conditions of walkways 399a and 399b, providing an optimal path that is estimated to require the least amount of time. For example, if the traffic in walkway 399b is particularly crowded even if the path itself is shorter, the interactive map might recommend the user to use walkway 399a instead since it might result in a shorter estimated time. Alternatively, the user might be interested in seeing a parade on the way even though it might take longer. Server 340 might then query the theme park schedule, determining that a parade will start at 5:00 pm along walkway 399b only. Thus, the interactive map might inform the user that departing for walkway 399b at 4:30 pm would allow for optimal viewing of the parade. The implementation of such graph optimization algorithms is well known in the art and can be engineered to meet the needs of the particular event.

In addition to or in conjunction with the mapping and routing abilities of the program code, scheduling capabilities might also provide the user with an additional layer of information to aid in planning. For example, daily scheduled events could be provided in a configurable timeline, sorted by proximity, popularity, event category, or some other desired characteristic. A user might select a number of events that interest him from a list, and the program code might organize a number of alternative schedules and itineraries based on the preferences of the user. In this manner, a user will be easily able to discern what is available, whether near or far, right now or into the future.

In response to changing user preferences, user movement, progression of time, refreshed queue time data, and other updated dynamic data, the mapping, routing, and scheduling presented to the user may also be updated in real-time to provide continually refreshed suggestions. For example, if the user changes activity preferences from prioritizing roller coaster rides to viewing stage events, a new schedule may be recalculated including more stage events, and mapping may redirect the user to the nearest stage event rather than the nearest roller coaster ride. If newly downloaded queue data indicates the nearest stage event has a long seating queue time, then the user may be redirected to another stage event with a shorter seating queue time. As conditions change, scheduling and routing may be recalculated and refreshed to best accommodate the changed conditions according to user preferences.

However, some users may prefer not to spend time and effort customizing user preferences, and may be content to receive recommendations based on default criteria such as queue wait times, distance, or popularity. In this case, new recommendations can still be presented to the user in response to user movement, progression of time, refreshed queue time data, and other updated dynamic data. Certain criteria may be weighed and prioritized based on a hypothetical typical user, providing optimized scheduling and routing to please a majority of users. For example, popular signature or "must-see" events might be prioritized first, whereas queue times might be prioritized second, and walking distance might be prioritized third. This is only one example default scheduling algorithm, and other algorithms may be developed to best meet the needs of users that elect not to provide particular user preferences for consideration. In this manner, users can still take advantage of continually updated scheduling and routing recommendations without having to provide specific user preferences.

Besides communicating with server 340, the wireless portable devices might interact with other devices over wireless network 360, directly or with the aid of server 340. For example, such interactivity might comprise communications between fellow users of the wireless portable devices. Recall Amy and Ben, the two friends who are in different areas. They may wish to meet up somewhere for coffee and a chat. Amy and Ben might have registered user accounts on server 340, mutually adding each other to a "friends list." The program code executing on wireless portable devices 350*a* and 350*b* might then read this friends list and allow designated "friends" to chat with each other, locate other friends on a map, and coordinate meetings by sending queries to server 340 or directly to each other over network 360. Thus, Amy and Ben could chat with each other, agree to meet at restaurant 393*b*, and then obtain a route to arrive there based on their current locations.

An alternative interaction might comprise a network based table reservation system for registered users, provided by restaurants 393*a* and 393*b*. Restaurants 393*a* and 393*b* might provide server 340 with updated reservation data, and wireless portable devices 350*a* and 350*b* might be able to query and reserve tables from server 340.

At step 430 of flowchart 400, wireless portable device 350*a* communicates with an expansion cartridge to connected to an expansion bay to receive static data 371 from infrared transmitter 370*a* via infrared link 329*a* while wireless portable device 350*a* is in a low power sleep state. As mentioned, the depiction of wireless portable device 350*a* has been simplified to integrate expansion cartridge 210 from FIG. 2. Furthermore, the infrared reception range of infrared transmitter 370*a* is omitted from FIG. 3 to simplify the diagram. Additionally, the sleep state of wireless portable device 350*a* can be handled by the methods in the discussion above concerning static data 271.

Using a similar method as done for wireless link 381*a*, wireless portable device 350*a* might match a unique identifier associated with infrared transmitter 370*a* to an infrared reception area retrieved from a database of known infrared transmitters. The database lookup of infrared transmitter 370*a* and its broadcasting range might more precisely locate wireless portable device 350*a* in the southern overlap of defined geographical area 390*a*. Wireless portable device 350*b* might be able to proceed similarly with respect to the infrared link 329*b*, but as the dotted line shows, wireless link 381*b* is unavailable due to wireless portable device 350*b* being outside defined geographical area 390*b*. Thus, in order to determine position, the database establishing relationships between infrared transmitter unique identifiers and associated location areas will need to be preloaded or previously downloaded from a once operational wireless link 381*b*. If this database data is available, wireless portable device 350*b* will be able to at least update its location as somewhere within the range of infrared transmitter 370*b*, but outside of any defined geographical area.

Although the present embodiment does not specify additional data that might be stored in static data 371*b*, other data might be transferred over infrared link 329*b* in alternative embodiments. For example, static data 371*b* might also include a map of nearby points of interest, such as restroom facilities, automatic teller machines, and wireless hotspots. However, data items that might be updated on a regular basis such as attraction and restaurant wait times might be kept off static data 371*b*, as it may be impractical to keep the static data frequently updated as previously discussed. Additionally, this discussion of static data 371*b* may also apply to static data 371*a*.

Figure 5:
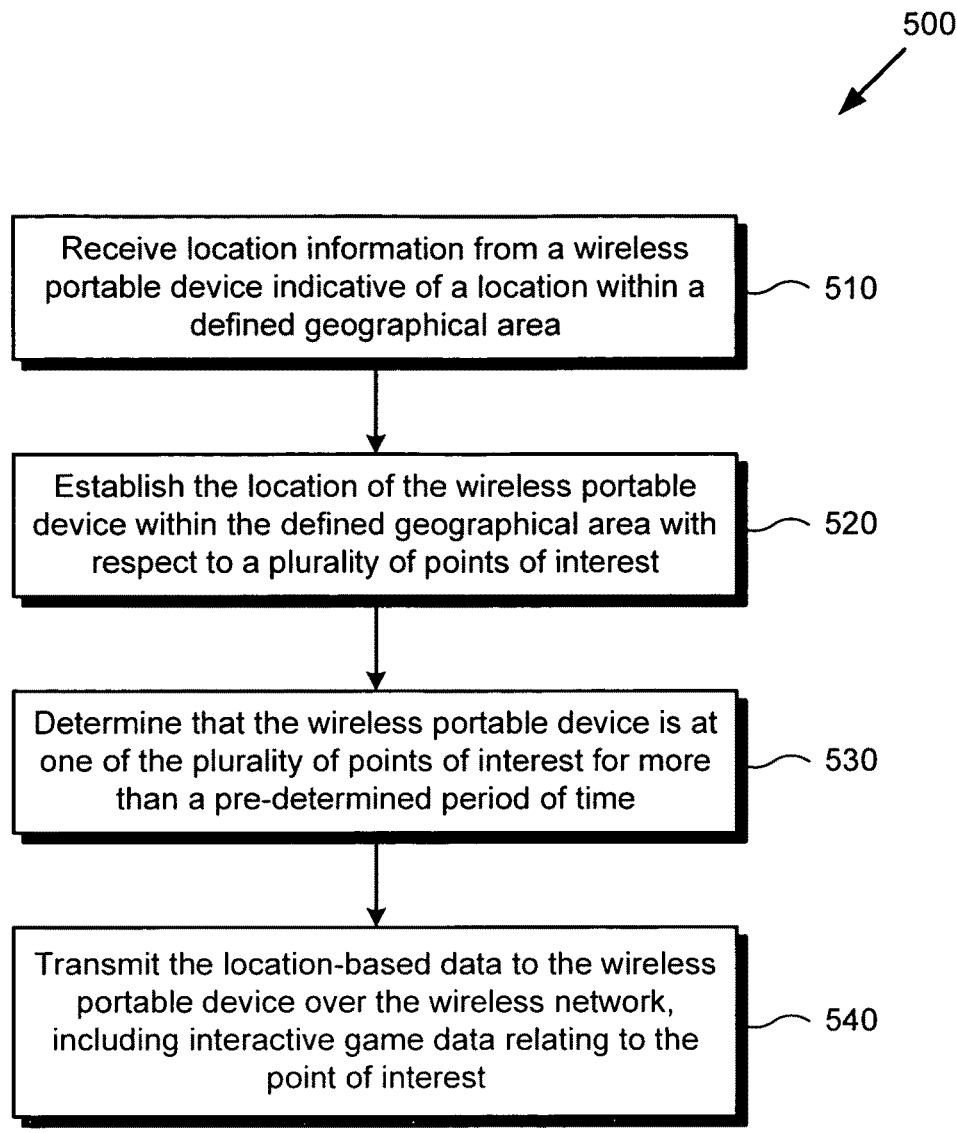
FIG. 5 shows a flowchart describing the steps, according to one embodiment of the present invention, by which a wireless server via a wireless network can provide location-based data to a wireless portable device in a defined geographical area including a plurality of points of interest.

Now that the capabilities of the wireless portable device have been discussed in some detail, now might be a good time to transition to FIG. 5 focusing on the server. FIG. 5 shows a flowchart describing the steps, according to one embodiment of the present invention, by which a wireless server via a wireless network can provide location-based data to a wireless portable device in a defined geographical area including a plurality of points of interest. Certain details and features have been left out of flowchart 500 that are apparent to a person of ordinary skill in the art. For example, a step may comprise one or more substeps or may involve specialized equipment or materials, as known in the art. While steps 510 through 540 indicated in flowchart 500 are sufficient to describe one embodiment of the present invention, other embodiments of the invention may utilize steps different from those shown in flowchart 500.

Referring to step 510 of flowchart 500 in FIG. 5 and location-based data system 300 of FIG. 3, step 510 of flowchart 500 comprises server 340 receiving locating information from wireless portable device 350*a* over wireless network 360, the location information indicative of a location within defined geographical area 390*a*. In other words, step 510 is the complement to step 410, but with the server as the acting party. Thus, the reader is directed to the discussion of step 410 above for details about step 510.

Continuing with step 520 of flowchart 500 in FIG. 5, step 520 comprises establishing the location of wireless portable device 350*a* within defined geographical area 390*a* with respect to the plurality of points of interest, including attraction 392*a* and restaurant 393*a*. Establishing the present location may be one important element in building a context that shapes the types of interactivity provided to the user. As an event grows larger and encompasses more area to traverse, the importance of establishing a location grows proportionally. This is especially true in the present embodiment represented in FIG. 3, where the event is a large theme park with multiple areas.

At step 530 of flowchart 500, wireless network 360 determines whether wireless portable device 350*a* is at one of the plurality of points of interest for more than a pre-determined period of time. For example, assuming that wireless portable device 350*a* were able to calculate its location to some precision within defined geographical area 390*a*, it might be able to report that wireless portable device 350*a* has moved to attraction 392*a* and has been idling for more than a pre-determined period of 10 minutes.

At step 540 of flowchart 500, if the result of step 530 is positive, then wireless network 360 provides wireless portable device 350*a* with interactive game data relating to attraction 392*a*. For example, a pirate themed videogame might be automatically downloaded to match pirate attraction 392*a*, providing the option for a light diversion. Trivia games might be downloaded, challenging guests to answer questions about the history of the pirate attraction in the theme park. If wireless portable device 350*a* is capable of video playback, teaser trailers for the next sequel of the theme park's long running pirate movie franchise might be provided for guests to view. Similarly, if wireless portable device 350*b* is detected to be at attraction 392*b* for more than 10 minutes, an outer space shooting game might be automatically downloaded, outer space trivia might be offered, and a trailer for an astronaut drama movie might be presented. Thus, step 540 in combination with step 530 can detect periods of inactivity and provide automatic relief in the form of location-based entertainment such as videogames, trivia, and video data as discussed above.

As previously mentioned, expansion cartridge 110 may store program code 120 within a ROM chip. The ROM chip may for example have a capacity from 64 megabits (Mb) to 2 gigabits (Gb) or larger, depending on total asset sizes upon completion of program code 120. Furthermore, the ROM chip may be accompanied by an Electrically Erasable Programmable Read-Only Memory (EEPROM) or flash memory chip, with a capacity from 4 kilobits (Kb) to 4 megabits (Mb) or larger, for storing preferences, saved itineraries, and other user data. In this manner, personalized data can be stored in a non-volatile fashion, surviving power cycles of wireless portable device 150 that would otherwise erase data in memory. Furthermore, by keeping user specific data on the EEPROM or flash memory, data transfers that would otherwise occur between wireless portable device 250 and server 240 may be eliminated, thereby conserving battery life by avoiding unnecessary network access.

Additionally, wireless portable device 150 may use program code 120 to access location-based data concerning several different locations, allowing a single consolidated expansion cartridge 110 or a single application download to support several geographically disparate locales, rather than requiring a separate expansion cartridge 110 or download for each locale. For example, continuing with the theme park example, if the theme park has several different national and international locations, then program code 120 may be configured to automatically detect and support all of these locations. Server 240 may then answer a locale query from wireless portable device 250 to indicate the present locale. Once a particular locale is detected, then program code 120 may limit navigational and guide data to only that particular locale, thus avoiding possible confusion from irrelevant navigational data regarding distant locales. Additionally, locales may not necessarily be fixed to one location. For example, moving locales such as large cruise ships might also be supported. Furthermore, multiple language localizations can also be consolidated into program code 120, better serving the needs of diverse domestic and international markets. Languages can then be selected based on a detected locale, or manually based on user preference.

One application of the wireless portable device may include an interactive map with routing, scheduling, and event reservation capabilities. More specifically, a mapping interface may be shown on display 153, which may comprise two separate displays with independent sections, or one larger display divided into two sections. A top section may provide an overview of the currently detected locale, and a bottom section may provide a zoomed in view of the guest's location. The specific location of the guest may be indicated in the bottom section by an icon labeled "You are Here," which is updated as the guest moves. This guest position may be detected by, for example, using the signal strength of detected wireless hotspots to triangulate a position, using a global positioning system (GPS) receiver embedded in expansion cartridge 110 or wireless portable device 150, using RFID systems, or by using other location detection methods. Using input control 154, a guest may input a desired route to a specific attraction, event, or location. For example, a guest may select a desired event from a list, then select a mapping icon to request that a route be mapped. In response, a pathway line may be shown on display 153 from the "You are Here" icon to the destination.

Since display 153 may be used in outdoor conditions, program code 120 may provide a high contrast and friendly iconic user interface for enhanced visibility even in direct sunlight. Additionally, to provide a familiar and comfortable experience, the design of the user interface, such as the style and color scheme, may be consistent with other related user interfaces, such as a website portal associated with the locale. Thus, if a guest has navigated the website portal in the past, there will be little difficulty in recognizing and using the user interface presented by program code 120. Related functions may be grouped together in the same user interface for easy overview, allowing guests to seek character events in the same menus as attractions, dining, and shows, or to view events with discrete start and stop times and events with continuous running cycles within the same user interface.

Additionally, to facilitate advance planning, program code 120 may offer an offline planning mode, where even if the guest is not detected within one of the supported locales, the guest may view maps of any of the supported locales, create itineraries, plan wish lists and routes, and save any other notes for a future visit to any of the supported locales. For example, to begin planning a route through a locale, attraction or map icons might be dragged and dropped into a wishing well or similar icon representing a wish list. Based on the desired attractions the guest wishes to visit, program code 120 may attempt to generate an optimized route that enables the guest to travel the least distance, wait the least in queue lines, select the best times for obtaining reservations and arriving at reserved events, or prioritize by other criteria. For an example of other criteria, if rainy weather is expected, program code 120 might suggest prioritizing weather-safe activities.

Once the guest is detected within the locale, alert messages or sounds may be used to indicate guest proximity to wish list items. However, to avoid potential disappointment from a false alert that may occur with events having unpredictable schedules such as character appearances, these alerts might be suppressed in favor of alerts for events having more regular and reliable schedules.

While in the offline planning mode, program code 120 might rely on a local historical database of traffic patterns to estimate foot traffic congestion, queue times, and best times for reservations. Additionally, the offline planning mode may provide fun diversions such as a car or airplane themed game to build excitement during transportation to the locale. However, if a local network connection to the Internet is available, such as one provided by a home or office router or a Wi-Fi hotspot, then program code 120 might access an online server to download updated real-time event and planning information. This may be used to automatically reorder and update planning schedules as new data arrives indicating changes to previous planning assumptions.

Once the guest actually arrives to the locale, a network of Wi-Fi hotspots or access points in the locale may then provide full coverage connectivity for wireless portable device 150, allowing continuous retrieval of dynamic data for updating planning schedules, guest location, mapping, and other functions. For network security, an embedded secret key such as a 128-bit Wired Equivalent Privacy (WEP) key in program code 120 might be used and recognized by the network of Wi-Fi hotspots.

Since continuous network access is a large battery drain for wireless portable device 150, data updates might be grouped into separate categories with different update frequencies, such as daily, hourly, and on the minute, thereby minimizing network usage and extending battery life. For example, general information unlikely to change frequently can be retrieved during a daily update, such as general point of interest descriptions, maintenance bulletins or seasonal unavailability updates, height or age restrictions, and other largely static data. More frequently updated data such as scheduling, queues, and traffic might be placed in hourly and/or on the minute updates. Updates might also be synchronized or coordinated with existing informational display systems, such as public digital signage, to prevent inconsistent display of planning data between wireless portable device 150 and the digital signage. Updates might also be pushed onto wireless portable devices on an as-needed basis, rather than having wireless portable devices polling for updated data.

To further preserve battery life, unessential functions such as background music, voice, and sound effects may be disabled or reserved for use by alerts or offline planning mode. Since wireless portable-device 150 may be used in noisy public environments, the disabling of sounds may pose less of a concern for guests when weighed against the benefit of extended battery life.

As previously described, filters may be applied for organizing and mapping to particular points of interest or activities in the currently detected locale. These points of interest may include timed or continuous events such as stage shows, parades, fireworks, character appearances, meet-and-greet sessions, or permanent locations such as dining, restrooms, and other amenities and services. For character appearances and meet-and-greet sessions in particular, the filters may be configured to return only a single nearest result to preserve the appearance that a character is only at a single place at any given time.

Dining options may be filtered by restaurant type, such as bakery, beverage, cart, counter, character themed dining, food court, ice cream shop, sit-down restaurant, and other categories. Filters can be applied for desired price ranges, seating types such as indoor or outdoor, cuisine types, and popular menu items such as pizza, ice cream, burgers, vegetarian offerings, and other requests. Guests may then be presented with restaurant descriptions, detailed menus, general price ranges, and other helpful information to plan their next meal.

Points of interest may also be temporally restricted within a set time period beyond the present time, such as 7 days, to allow guests to easily plan itineraries for the near future without being bogged down by data for events happening much later in the future. Additionally, a lateness buffer may be applied to the temporal restriction to allow retrieval of timed events that are already in progress but have only just started, allowing late arrivals to still catch and enjoy the majority of the timed event.

The filters may then be applied to sort event attractions by queue times, show times, and reservation times, by popularity lists such as "Top 10 attractions," by transfer or no-transfer wheelchair accessibility, or by recommended age generation/height, family friendliness, or thrill seeker levels. Restrictive filters may also remove attractions from consideration, such as health filters to remove attractions unsuitable for persons with heart conditions, persons with epilepsy, expectant mothers, and other considerations. Thus, a guest that indicates particular special needs can safely seek and enjoy attractions without compromising health and wellness. Additionally, some filters may be applicable to individual guests while others may be applied to groups. For example, a family might plan family activities together such as a shared dinner or parade, whereas individual family members might reserve attraction times or plan other personal activities according to their individual interests.

Additionally, wireless portable device 250 may provide various features to ensure interoperability with existing queuing and reservation systems. For example, a reservation ticketing system issuing event tickets with reservation time windows may already be in use at the locale, but not fully integrated into dynamic data 241. As a workaround, a guest might be able to manually enter a ticket number into wireless portable device 250, which could then extract location and reservation time windows from the ticket number to integrate the ticket reservation in route and schedule planning. Thus, the reservation by ticket is still fully accounted for during planning, even though the ticketing system is not yet fully integrated and supported by server 240. As previously discussed, reservations such as ticket reservations might apply to guests as individuals or to groups of guests.

As previously discussed, program code 120 might also provide various games and diversions to help the time go by during queues and other wait times. Each locale may have several location triggers to present an area-based trivia game asking random-not-repeat trivia questions specific to the area or more general to the locale. Trivia difficulty may be user selectable before playing, and game progress might be tracked as quick one-off sessions or continuous all day campaigns.

In addition, queue locations may already have installed interactive game elements to entertain guests that do not carry wireless portable device 150. To enhance this experience for guests that do carry wireless portable device 150, program code 120 can be configured to interact with the already existing interactive game elements. For example, a queue line for a space themed ride attraction may have an interactive game installation where alien spacecraft are projected onto a wall and guests use props or gestures to shoot at the alien spacecraft. Guests with wireless portable devices might then be presented with a mini-game through program code 120, for which completion or skillful performance may, for example, unlock power ups, provide special powers, or otherwise assist guests that are already interacting with the existing interactive game installation. In this manner, both guests with or without the wireless portable devices can team up in a cooperative in-queue gameplay experience, livening the atmosphere and reducing the burden of waiting for the queue to advance.

As described in the foregoing, a system and method for providing location-based data on a wireless portable device supports scheduling, planning, navigation, and entertainment that is relevant to the user environment. This location-based relevancy brings a measure of usefulness and immediacy that generic information cannot provide, allowing users to efficiently plan for the present and the future, or alternatively allowing users to pass away involuntary periods of idle time more enjoyably by accessing location-based entertainment that is automatically provided.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A wireless portable device for providing dynamic location-based data to a user when the wireless portable device is within a first geographical area, and providing static location-based data to the user when the wireless portable device is outside of the first geographic area, the wireless portable device comprising:
a wireless transmitter configured to transmit location information, determined by the wireless portable device, to a wireless server over a wireless network having a plurality of wireless access points, wherein the location information is indicative of a location of the wireless portable device within the first geographical area;
a first wireless receiver operating according to a first wireless protocol, the first wireless receiver configured to receive the dynamic location-based data according to the location of the wireless portable device from the wireless server via one of the plurality of wireless access points, periodically and automatically, in response to transmitting the location of the wireless portable device to the wireless server, when the location of the wireless portable device is in the first geographical area;
a second wireless receiver operating according to a second wireless protocol different than the first wireless protocol, the second wireless receiver configured to receive the static location-based data transmitted from a wireless static data transmitter when the wireless portable device is outside of the first geographic area and does not receive the dynamic location-based data from the wireless server, wherein the static location-based data includes a unique identifier of the wireless static data transmitter, and wherein the wireless portable device is configured to utilize the unique identifier to associate the wireless static data transmitter with a specific defined area, and update the location of the wireless portable device using the specific defined area associated with the wireless static data transmitter; and
a display configured to display a first information obtained from the dynamic location-based data based on the location of the wireless portable device when the wireless portable device is within the first geographical area, and a second information obtained from the static location-based data based on the updated location of the wireless portable device when the wireless portable device is outside of the first geographic area.

2. The wireless portable device of claim 1, wherein the wireless portable device receives a preference list of activities from the user, and wherein the dynamic location-based data are generated using the preference list of activities.

3. The wireless portable device of claim 1, wherein prior to receiving the dynamic location-based data, the first wireless receiver is further configured to receive locale data for selecting the first geographical area from a list of supported geographical areas.

4. The wireless portable device of claim 1, wherein the display is further configured to display a map with a pathway line traveling through a route for completing a schedule of activities of the user.

5. The wireless portable device of claim 1, wherein the dynamic location-based data are generated further using a filter according to a preference of the user.

6. The wireless portable device of claim 1, wherein the first wireless receiver uses signal strength to the plurality of access points to triangulate the location information.

7. The wireless portable device of claim 1, wherein the wireless portable device is configured to optimize a schedule of activities of the user using the dynamic location-based data to reduce a total required travel distance to complete the schedule of activities.

8. The wireless portable device of claim 1, wherein the wireless portable device is configured to optimize a schedule of activities of the user using the dynamic location-based data to reduce a total required queue wait time to complete the schedule of activities.

9. The wireless portable device of claim 1, wherein a schedule of activities for the user includes activities having reservation time windows, and wherein the wireless portable device is configured to optimize the schedule of activities such that the activities having reservation time windows can be initiated during their respective reservation time windows.

10. The wireless portable device of claim 1, wherein the wireless portable device determines the location information using a global positioning system (GPS).

11. The wireless portable device of claim 1 further comprising:
an expansion bay configured to externally receive an expansion cartridge including the second wireless receiver.

12. The wireless portable device of claim 1, wherein the first geographical area includes a plurality of points of interest, and wherein the plurality of points of interest include a character appearance, wherein the display is further configured to display a single place in the first geographical area for the character appearance.

13. A method for use by a wireless portable device for providing dynamic location-based data to a user when the wireless portable device is within a first geographical area, and providing static location-based data to the user when the wireless portable device is outside the first geographic area, the method comprising:
transmitting, using a wireless transmitter of the wireless portable device, location information determined by the wireless portable device to a wireless server over a wireless network having a plurality of wireless access points, wherein the location information is indicative of a location of the wireless portable device within the first geographical area;
receiving, using a first wireless receiver of the wireless portable device operating according to a first wireless protocol, the dynamic location-based data according to the location of the wireless portable device from the wireless server via one of the plurality of wireless access points, periodically and automatically, in response to transmitting the location of the wireless portable device to the wireless server, when the location of the wireless portable device is in the first geographical area;
receiving, using a second wireless receiver of the wireless portable device operating according to a second wireless protocol different than the first wireless protocol, the static location-based data transmitted from a wireless static data transmitter when the wireless portable device is outside the first geographic area and does not receive the dynamic location-based data from the wireless server, wherein the static location-based data includes a unique identifier of the wireless static data transmitter, and wherein the wireless portable device is configured to utilize the unique identifier to associate the wireless static data transmitter with a specific defined area, and update the location of the wireless portable device using the specific defined area associated with the wireless static data transmitter;

displaying, using a display of the wireless portable device, a first information obtained from the dynamic location-based data based on the location of the wireless portable device when the wireless portable device is within the first geographical area; and displaying, using the display of the wireless portable device, a second information obtained from the static location-based data based on the updated location of the wireless portable device when the wireless portable device is outside of the first geographic area.

14. The method of claim 13, wherein the wireless portable device receives a preference list of activities from the user, and wherein the dynamic location-based data are generated using the preference list of activities.

15. The method of claim 13, wherein prior to receiving the dynamic location-based data, the first wireless receiver receives locale data for selecting the first geographical area from a list of supported geographical areas.

16. The method of claim 13, wherein the display further displays a map with a pathway line traveling through a route for completing a schedule of activities of the user.

17. The method of claim 13, wherein the dynamic location-based data are generated further using a filter according to a preference of the user.

18. The method of claim 13, wherein the first wireless receiver uses signal strength to the plurality of access points to triangulate the location information.

19. The method of claim 13, wherein the wireless portable device optimizes a schedule of activities of the user using the dynamic location-based data to reduce a total required travel distance to complete the schedule of activities.

20. The method of claim 13, wherein the wireless portable device optimizes a schedule of activities of the user using the dynamic location-based data to reduce a total required queue wait time to complete the schedule of activities.

21. The method of claim 13, wherein a schedule of activities for the user includes activities having reservation time windows, and wherein the wireless portable device optimizes the schedule of activities such that the activities having reservation time windows can be initiated during their respective reservation time windows.

22. The method of claim 13, wherein the schedule of activities further includes booking activities for reserving the activities having reservation time windows.

23. The method of claim 13, wherein the wireless portable device determines the location information using a global positioning system (GPS).

24. The method of claim 13, wherein the second wireless receiver is part of an expansion cartridge received by an expansion bay of the wireless portable device.

25. The method of claim 13, wherein the first geographical area includes a plurality of points of interest, and wherein the plurality of points of interest include a character appearance, wherein the display displays a single place in the first geographical area for the character appearance.

26. A wireless portable device for providing dynamic location-based data to a user when the wireless portable device is within a first geographical area, and providing static location-based data to the user when the wireless portable device is outside the first geographic area, the wireless portable device comprising:

a wireless transmitter configured to transmit location information determined by the wireless portable device to a wireless server over a wireless network having a plurality of wireless access points, wherein the location information is indicative of a location of the wireless portable device within the first geographical area;

a first wireless receiver operating according to a first wireless protocol, the first wireless receiver configured to receive the dynamic location-based data according to the location of the wireless portable device from the wireless server via one of the plurality of wireless access points, periodically and automatically, in response to transmitting the location of the wireless portable device to the wireless server, when the location of the wireless portable device is in the first geographical area;

a second wireless receiver operating according to a second wireless protocol different than the first wireless protocol, the second wireless receiver configured to receive the static location-based data transmitted from a wireless static data transmitter when the wireless portable device is outside the first geographic area and does not receive the dynamic location-based data from the wireless server, wherein the static location-based data includes information indicative of a location of the wireless static data transmitter, and wherein the wireless portable device is configured to update the location of the wireless portable device based on the location of the wireless static data transmitter; and a display configured to display a first information obtained from the dynamic location-based data based on the location of the wireless portable device when the wireless portable device is within the first geographical area, and a second information obtained from the static location-based data based on the updated location of the wireless portable device when the wireless portable device is outside of the first geographic area.

* * * * *